Patented Jan. 17, 1950

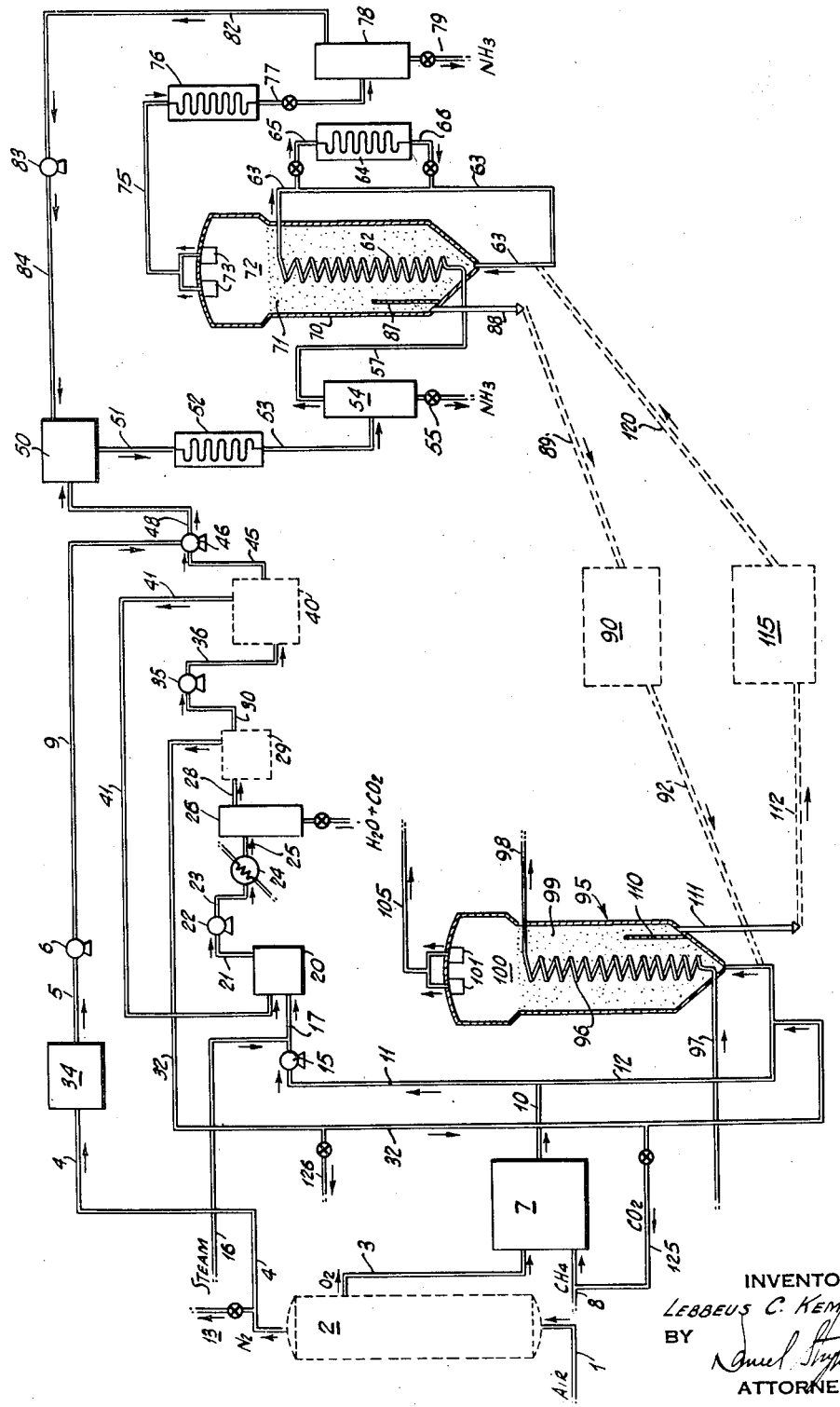

2,494,561

UNITED STATES PATENT OFFICE 2,494,561

COMBINATION PROCESS FOR THE HYDROGENATION OF CARBON MONOXIDE AND THE PRODUCTION OF AMMONIA

Lebbeus C. Kemp, Jr., Scarsdale, N. Y., assignor to The Texas Company, New York, N. Y., a corporation of Delaware Application December 29, 1945, Serial No. 637,953

6 Claims. (Cl. 23—198)

This invention relates to the use of a process for hydrogenating carbon monoxide to produce hydrocarbons, oxygenated hydrocarbons and the like in conjunction with a process for the synthesis of ammonia.

In accordance with this invention, a mixture of nitrogen and hydrogen in an appropriate ratio, which is usually 1:3, is introduced into a reaction zone containing a catalytic material suitable for the conversion of nitrogen and hydrogen into ammonia. The mass of catalytic material contained in the reaction zone is in a finely divided state of subdivision. The particle size and density of the catalytic material is correlated with the velocity at which the gaseous reactants are introduced into the reaction zone so that the catalytic material is maintained in a fluidized state. The invention involves a conjective process using a common catalyst wherein the catalyst which is employed in the ammonia synthesis is also used to effect hydrogenation of carbon monoxide. An iron powder containing small amounts of aluminum oxide and potassium oxide as promoters is an example of a catalyst effective for both synthesis reactions.

Since the ammonia synthesis does not proceed to an appreciable degree at ordinary pressures, the fluid bed reactor in which the ammonia synthesis occurs is built to withstand elevated pressures. Below 100 atmospheres the percent conversion per pass is usually so low that economic operation is impractical. As a consequence, the catalytic conversion of nitrogen and hydrogen employing a fluidized catalyst occurs at pressures from about 150 atmospheres up to about 400 atmospheres.

A settling space is provided at the top of the reaction zone so that the major portion of any catalyst which is entrained in the fluid system precipitates therefrom as a result of the action of the forces of gravity. Further means such as cyclone separators or electrical precipitators are provided for complete removal of catalyst from the effluent stream leaving the reactor.

The exothermic heat of reaction is removed through indirect heat exchange. A plurality of tubes through which a heat exchange medium flows is positioned throughout the reaction zone. In the preferred embodiment of this invention the stream of reactants is passed through the heat exchange tubes so that the reactants are raised to approximately the temperature of reaction during absorption of the excess exothermic heat of reaction. In this modification the reactants act as the heat exchange medium.

The maintenance of the catalyst in the fluid state results in excellent dissipation of heat. The removal of the gas film from the surface of the catalyst by the scrubbing action of the turbulent gases and the constant renewal of said film by fresh gas facilitates indirect heat exchange. Moreover the continual contact of catalyst particles with the heat exchange surface reduces the depth of the film coating the surface and increases the rate of heat transfer between the catalyst and the indirect heat transfer surface. Thus heat control is simplified in the fluid bed type of ammonia conversion revealed in this invention.

Excellent conversion of hydrogen and nitrogen into ammonia is obtained using a fluid dense phase system of catalytic conversion. The typical Haber process only attains a conversion of 5 to 10 per cent per pass of reactants. Using a fluid bed type of conversion yields in the range of about 10 to 25 per cent and better per pass are obtained.

The use of a fluid dense phase system for the catalytic synthesis of ammonia offers many advantages.

One advantage resides in the fact that better temperature control is effected during the conversion. It is possible to maintain a temperature gradient throughout the reactor which is in the range of 3 to 5° F. By the maintenance of such an efficient temperature control, there is avoided the deterioration of the catalyst which results from the formation of hot spots in a fixed bed type of conversion.

A further advantage results from the fact that improved yields are obtained through adaptation of the fluid technique to the ammonia synthesis.

A third advantage is obtained by conducting the synthesis so that it is practically autothermic. This result is obtained when the reactant stream is passed in indirect heat exchange through the reactor so that it is raised to approximately the reaction temperature as it simultaneously removes excess exothermic heat of reaction.

Using the type of ammonia synthesis which has been disclosed above, this invention further contemplates carrying out the hydrogenation of carbon monoxide in conjunction with the synthesis of ammonia so as to effect substantial improvements and economies in both processes.

In large scale operations in which carbon monoxide is hydrogenated to form valuable hydrocarbon or oxygenated hydrocarbon products, it has been established that a very satisfactory method of preparing a mixture of carbon monoxide and hydrogen—also referred to as synthesis gas—is to oxidize a hydrocarbon gas such as methane with a gas containing at least about 70% molecular oxygen. The most readily available source of molecular oxygen is air; through various well-known procedures, air may be liquefied and then separated into its gaseous components by fractional distillation. The oxygen so obtained is utilized to oxidize methane or other hydrocarbon gas to yield a synthesis gas mixture of carbon monoxide and hydrogen in a molecular ratio of about 1:2.

There is obtained as a result of the fractional distillation of the liquefied air a large amount of nitrogen which, in most carbon monoxide-hydrogenation processes, is vented. In the process of this invention, however, this nitrogen is used at least in part in the catalytic synthesis of ammonia.

In this invention, a portion of synthesis gas, obtained by the oxidative combustion of a hydrocarbon gas with oxygen, is subjected to reaction with steam in the presence of a suitable catalyst. Thereby the water gas-shift reaction occurs in accordance with the equation:

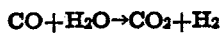

$$CO + H_2O \rightarrow CO_2 + H_2$$

The carbon monoxide present in this portion of the synthesis gas is converted to carbon dioxide and more hydrogen is also formed. Thus a gas is obtained containing about one part of carbon dioxide to about three parts of hydrogen. There are also minor quantities of carbon monoxide, steam and nitrogen present in this gas.

Hydrogen is obtained in a highly purified state, which is necessary for ammonia synthesis, by removing carbon dioxide, carbon monoxide and water vapor from this gas by suitable procedures. Pure hydrogen so obtained is combined with a suitable portion of nitrogen obtained from the fractional distillation of liquefied air. A suitable ratio for the mixture of nitrogen and hydrogen to be introduced into an ammonia synthesis converter is about 1:3. After the nitrogen-hydrogen mixture has been raised to an elevated pressure in the range of 150 to 400 atmospheres, it is introduced into an ammonia converter in which there is employed the fluidized dense phase type of catalytic conversion previously described.

An iron catalyst which is generally promoted with one or more promoters, such as potassia and alumina, is used to effect the catalytic conversion of nitrogen and hydrogen into ammonia. The particle size of this catalyst is selected so that fluidization is readily obtained. Provision is made for continuously removing a portion of this catalyst from the fluidized converter wherein the ammonia synthesis takes place. The catalyst which is continuously removed is cooled and depressurized and then introduced into the reactor wherein the catalytic conversion of carbon monoxide and hydrogen into hydrocarbons or oxygenated hydrocarbons takes place.

A catalyst which has been used in ammonia synthesis has been found to be extremely effective in the hydrogenation of carbon monoxide. Iron catalyst is maintained in a fluidized state in the carbon monoxide-hydrogenation reactor also. Carbon monoxide and hydrogen are converted into desired products by contact with this fluidized iron catalyst which has been obtained from the ammonia synthesis.

The iron catalyst is continuously removed from the fluidized reactor in which the hydrogenation of carbon monoxide occurs and subjected to a regenerative process. Regeneration usually consists of oxidation followed by reduction. After the iron catalyst has been regenerated and its concentration of promoters restored to the initial level, if necessary, it is introduced into the ammonia synthesis to replace the catalyst which is continuously withdrawn for introduction into the carbon monoxide-hydrogenation reactor.

By continuously recycling the catalyst in this fashion from the ammonia synthesis to the hydrogenation of carbon monoxide to a regenerative process and then back to the ammonia synthesis, optimum catalytic activity is realized in both synthetic processes, namely, the ammonia synthesis and the hydrogenation of carbon monoxide. The gradual deactivation which ordinarily accompanies both syntheses is mitigated for fresh active catalyst is continuously added to both of the syntheses.

Many advantages accrue from the use of a process for the catalytic conversion of carbon monoxide and hydrogen into hydrocarbons or oxygenated hydrocarbons in conjunction with a process for the catalytic synthesis of ammonia from its elements.

An important advantage is that the nitrogen which is obtained from the fractional distillation of liquefied air in the preparation of oxygen is utilized at least in part. This invention provides a means of utilizing at least a portion of this nitrogen which would otherwise be merely a waste product.

A second advantage results from the fact that the same catalyst is catalytically active in both processes. By continuously circulating the catalyst from the ammonia synthesis to the carbon monoxide-hydrogenation reactor to a catalyst regenerator process and then back to the ammonia converter, the catalyst activity is preserved at an optimum in both of the catalytic conversions. Thus maximum yields are continually obtained from both processes.

A third advantage resides in the fact that a common synthesis gas generator provides a source of hydrogen for both the synthesis of ammonia and the hydrogenation of carbon monoxide. By the controlled oxidative combustion of methane or another hydrocarbon gas with a gas containing a high percentage of molecular oxygen, a gas containing carbon monoxide and hydrogen in the approximate ratio of 1:2 is formed. A portion of this gas is used directly in the catalytic conversion of carbon monoxide and hydrogen into desired hydrocarbon products and another portion of it is subjected to the water gas-shift reaction in order to increase the percentage of hydrogen present therein. The hydrogen components of this gas are separated from the other constituents present therein and thereafter are used in the ammonia synthesis.

In order that the process of this invention may be more fully understood and aptly described, one modification of the invention will now be presented in the form of a flow diagram which is attached. Many other features and advantages of the invention will be apparent from the detailed description of the process in conjunction with the drawing. It is to be understood, however, that this is only one modification of the use of the hydrogenation of carbon monoxide in conjunction with the ammonia synthesis and no limitation is thereby intended. In order to simplify the diagram of such an extensive process, the drawing is presented in outline form and many obvious functional details, such as heat exchangers and pumps, are omitted.

Air is introduced through a pipe 1 into an air rectification unit 2. The rectification unit 2 is of one of the conventional types in which air is liquefied by passage through heat exchangers, compressors and expanders. The liquefied air is then fractionally distilled in a fractionating column which forms part of the air rectification unit 2. The complete rectification process is represented in the diagram by the unit 2.

Oxygen in a high degree of purity, that is, from 90% up, leaves the rectification unit 2 through the pipe 3. Nitrogen, whose purity is also of high degree, leaves the rectification unit 2 through a pipe 4. The amount of nitrogen so obtained is approximately four times that of the oxygen. In conventional operation, this nitrogen would be vented in its entirety. The utilization of nitrogen in the method of this invention will be described in detail below.

The nitrogen obtained from the air rectification may be purified from any residual oxygen contained therein by passing the nitrogen through heated copper foil, thereby removing the oxygen by the formation of cupric oxide. Alternatively, the nitrogen which is to be used for the ammonia synthesis may be passed into the water gas-shift reactor whose function will be described in detail later. Therein the oxygen which is the main impurity in the nitrogen will react with the carbon monoxide and hydrogen also introduced thereto to form either carbon dioxide or water. Other methods are also available for the removal of oxygen from the nitrogen stream.

The oxygen obtained from the rectification of air proceeds along a pipe 3 to a synthesis gas generator 7. The oxygen is advantageously preheated and precompressed prior to its entry into the generator 7. A hydrocarbon gas, which is obtained from a source not shown and which is usually methane, is introduced into the synthesis gas generator 7 through a pipe 8. For the sake of convenience, this gas will be referred to henceforth as methane. Methane is also usually compressed and preheated before admission into the generator 7. Although not shown in the diagram, the oxygen and methane are advantageously premixed so that the compression and preheating are accomplished in single operations.

In the synthesis gas generator 7, the methane undergoes a controlled oxidation to form a mixture of carbon monoxide and hydrogen in the molecular ratio of about 1:2. The oxidative combustion taking place in the generator 7 may be controlled by the introduction of recycle carbon dioxide, which will be mentioned later, or by the introduction of steam thereto which is not shown in the diagram. The synthesis gas generator may be of such a nature that the exothermic heat of reaction may be converted into available mechanical energy as, for example, through the operation of a gas turbine. If such a device is used for the synthesis gas generator, the mechanical energy which is so obtained may be advantageously used in the air rectification unit for the compression of air during the liquefaction.

Carbon monoxide and hydrogen leave the generator 7 through a pipe 10. The synthesis gas proceeds along the pipe 10 to a Y intersection at which the pipe 10 splits into two branch pipes 11 and 12. Means are provided at this intersection for regulating the quantity of synthesis gas which flows through each branch pipe. The synthesis gas is divided at this point into two portions, one of which is to be used for the hydrogenation of carbon monoxide and the other to be used in the preparation of hydrogen for the synthesis of ammonia. The relative size of these portions will be determined by the actual capacity and per diem production of the ammonia synthesis unit and the carbon monoxide-hydrogenation unit. The portion of the synthesis gas which is to be used for the hydrogenation of carobn monoxide proceeds along the branch pipe 12 and its further treatment will be described in detail later.

The portion of synthesis gas which is to be used to prepare hydrogen for the ammonia synthesis passes along the branch pipe 11 to a compressor 15, wherein it is raised to a pressure of about 10 to 20 atmospheres. Synthesis gas leaves the compressor 15 at this elevated pressure through a pipe 17. Steam is generated at 10-20 atmospheres in a generator not shown and is introduced into the pipe 17 through a pipe 16. The mixture of synthesis gas and steam thereby formed is introduced into a catalyst-containing reactor 20 through the pipe 17. In the reactor 20, the mixture of synthesis gas and steam undergoes water gas-shift reaction to form carbon dioxide and hydrogen, as represented by the following equation:

$$CO + H_2O \rightarrow CO_2 + H_2$$

To proceed at an economically feasible rate, it is necessary to maintain a temperature of about 800 to 1,000° F. in the reactor 20. The presence of a catalyst such as iron oxide and the maintenance of an elevated pressure of about 10 to 20 atmospheres also accelerates the reaction.

As indicated previously, the nitrogen which is to be used for the ammonia synthesis may be purified of any traces of oxygen which it contains by introducing it into the water gas-shift reactor 20. While this alternative is not shown in the diagram, this is one method of nitrogen purification.

The products of the water gas-shift reaction which comprise mainly carbon dioxide and hydrogen leave the water gas-shift reaction zone 20 through a pipe 21 and enter into the compressor 22. Unreacted carbon monoxide and steam are present in the effluent from the water gas-shift reaction. The ammonia catalyst is very sensitive to poisons, such as carbon dioxide, carbon monoxide and steam, and, therefore, it is necessary to highly purify this gas mixture before its major constituent, hydrogen, can be used for the ammonia synthesis. The purification steps will now be outlined briefly.

The gas stream, containing about 60 to 75% hydrogen, leaves the compressor 22 in which it has been raised to about 20 to 40 atmospheres through a pipe 23 and is introduced into a cooler 24 wherein it is chilled so as to condense the excess water vapor present therein. At the existing pressures, much of the water vapor condenses therein and absorbs a substantial portion of the carbon dioxide present in the gas stream. The stream then flows through a pipe 25 into a gas liquid separator 26 wherein the condensed water containing absorbed carbon dioxide is separated from the gases. The carbon dioxide containing water is discharged through a drawoff pipe 27.

The gases leave the gas-liquid separator through a pipe 28 and are introduced into a carbon dioxide absorbing unit 29. Therein the remaining carbon dioxide content of the gaseous stream is absorbed in a suitable solvent such as monoethanolamine solution. Further portions of water vapor present in the gaseous stream are condensed in the absorbing unit 29 since it is advantageously refrigerated in order to aid the absorption of carbon dioxide. The existing elevated pressure expedites the absorption. The gas from which the carbon dioxide has been stripped leaves the absorbing unit 29 through a pipe 30. This gas contains about 90 to 95% hydrogen and minor quantities of carbon monoxide, carbon dioxide and water vapor.

Upon regeneration of the carbon dioxide-absorbent in a regenerator section of the absorbing unit 29, carbon dioxide is liberated and leaves the absorbing unit 29 through a pipe 32. The disposal of this carbon dioxide will be described in detail later.

Carbon dioxide-stripped gas proceeds along the pipe 30 to a compressor 35 wherein the gas is raised to a pressure of about 40 to 60 atmospheres. The gas, containing mainly hydrogen and a minor portion of impurities like carbon dioxide, carbon monoxide and water vapor, passes from the compressor 35 to an absorbing unit 40 through a pipe 36.

The absorbing unit 40 contains an ammoniacal solution of a cuprous salt. At an elevated pressure and at a low temperature, the ammoniacal cuprous salt solution serves as an excellent absorbent for carbon monoxide and also removes the remaining traces of carbon dioxide. Moreover, any oxygen which is present is also absorbed. A stream of hydrogen from which all the impurities except water vapor have been removed leaves the absorbing unit 40 through a pipe 45.

Upon regeneration of the ammoniacal cuprous salt solution in a regenerator section of the absorbing unit 40, carbon monoxide and the other impurities which have been removed by this treatment are liberated and leave the absorbing unit 40 through a pipe 41. Since carbon monoxide is the main constituent of this desorbed gas, it is returned to the water gas-shift reactor 20 through the pipe 41. Therein the carbon monoxide present in the gas undergoes a water gas-shift reaction.

The purified hydrogen, containing at this point only water vapor as a contaminant, passes along the pipe 45 to a multi-stage compressor 46.

To the compressor, there is also introduced at least a portion of the nitrogen which has been obtained by the fractionation of air in the rectification unit 2. The nitrogen which is not to be used for the ammonia synthesis is vented through a vent 13. Since it is at a low temperature, it may be used for refrigeration in various parts of the system where refrigeration is called for. The nitrogen which is to be used for the ammonia synthesis passes along a pipe 4 to a purifier 34 wherein the traces of oxygen present in the nitrogen are removed by contact with hot copper foil. The purified nitrogen then passes along a pipe 5 to a compressor 6 wherein it is raised to a pressure of about 40 to 60 atmospheres. The nitrogen then proceeds along a pipe 9 to the multi-stage compressor 46.

In the compressor 46, the nitrogen-hydrogen mixture which still contains a small quantity of aqueous vapor is raised to the pressure at which the ammonia conversion takes place. This pressure will be in the range of 150 to 400 atmospheres. After compression, the reactants pass along a pipe 48 to a pressurized chamber 50 wherein they are combined with recycle unreacted nitrogen and hydrogen which retain a considerable quantity of ammonia vapor even after the major portion of the produced ammonia has been removed by liquefaction. Since the synthesis conversion in the ammonia reactor may be only about 10 to 25% per pass, it is necessary to recycle unconverted nitrogen and hydrogen. The ammonia vapor present in this recycled nitrogen and hydrogen acts as an absorbent to remove the water vapor present in the compressed nitrogen-hydrogen mixture of the fresh feed.

In the chamber 50, the aqueous vapor present in the fresh feed of nitrogen and hydrogen is absorbed by the ammonia vapor present in the recycle stream of nitrogen and hydrogen. The treatment of the recycle stream prior to its introduction into the chamber 50 will be described in detail later. The combined fresh feed and recycle stream leave the chamber 50 and pass along a pipe 51 to a refrigerating chamber 52. The excess nitrogen which is not used in the ammonia syntheses may be used as the refrigerant in the chamber 52. Therein the aqueous ammonia is condensed. From the refrigerating chamber 52, the nitrogen and hydrogen and condensed aqueous ammonia pass into a gas-liquid separator 54 through a pipe 53. In the separator 54, the condensed aqueous ammonia is removed from the gaseous reactants through a drawoff pipe 55. The aqueous ammonia then passes to storage which is not shown.

The nitrogen and hydrogen, from which all traces of impurities have now been removed, leave the separator 54 through a pipe 57. The reactants are at an elevated pressure of about 150 to 400 atmospheres and at a low temperature as a result of refrigeration. Under these conditions, the reactants pass through the cooling tubes designated by the numeral 62 located within a reactor 70 and which serve to remove the exothermic heat of reaction formed by the synthesis of ammonia. In order for the ammonia synthesis to proceed at an economically feasible rate, it is necessary for the reactants to be heated to a temperature of about 500 to 650° C. By passage through the tubes 62, the reactant stream is heated to approximately the reaction temperature thus utilizing excess heat of reaction from the ammonia synthesis.

The stream of reactants leaves the heat exchange coil 62 through a pipe 63. The reactants are now at approximately the desired reaction temperature but if auxiliary heating is required, it may be provided by a heater 64 into which the reactants may be led through a branch pipe 65. After having attained the proper temperature in the heater 64, the reactants return to the pipe 63 through a pipe 66. This alternate route for the reactants provides means for adjusting the reactant stream to any desired temperature.

The reactants enter the synthesis converter 70 through a pipe 63. The velocity and density of the incoming nitrogen and hydrogen are such that they maintain a mass of finely divided iron catalyst present in the reactor 70 in a state of gentle ebullition. It is possible to maintain the catalyst in a fluid state simulating a condition of gentle boiling by correlating the velocity and density of the incoming gases with the particle size and density of the powdered catalyst contained in the reactor 70. The finely divided iron catalyst, which is advantageously promoted with about 1 to 2% potassium oxide and 2 to 3% aluminum oxide by weight is designated in the drawing by the numeral 71.

The exothermic heat of reaction is dissipated by indirect heat exchange with the stream of reactants which pass through the coil 62 prior to their entry into the converter proper for the ammonia conversion. Additional cooling, if necessary, may be provided by an auxiliary evaporative system, not shown, using diphenyl oxide or water. A large settling space 72 is provided in the upper portion of the reactor 70 in order to separate entrained powdered catalyst through the action of gravity. A series of filters 73 or other means of catalyst separation, such as cyclone separators or electrical precipitators, are provided in the upper portion of the reactor in order to complete the separation of the entrained catalyst from the effluent stream of products and unconverted reactants from the reactor 70.

The effluent stream from the ammonia synthesis reactor usually contains a large portoin of unconverted reactants since the percentage conversion per pass may be only about 10 to 25% per pass. As a consequence, it is necessary to separate the products from unconverted reactants and recycle the latter to the synthesis reactor. The products and unconverted reactants leave the reactor 70 through a pipe 75 after the entrained catalyst has been separated therefrom by one of the methods which has been briefly mentioned above. The effluent containing both unconverted reactants and ammonia passes along the pipe 75 to a refrigerating chamber 76. In the refrigerating chamber 76, the effluent is cooled sufficiently to effect the liquefaction of ammonia at the existing pressure, namely, about 150 to 400 atmospheres.

The unconverted nitrogen, hydrogen and the liquefied ammonia leave the refrigerating chamber 76 through a pipe 77 and enter into a gas-liquid separator 78. Therein the liquid ammonia is withdrawn through a pipe 79 and is led to storage, not shown.

The unconverted reactants, nitrogen and hydrogen, together with ammonia vapor which has not been liquefied, leave the gas-liquid separator 78 through a pipe 82 and are introduced into a compressor 83. In the compressor 83, the gases are compressed in order to compensate for any diminution of pressure which has occurred in the catalytic conversion. After the recycled unconverted reactants have attained a pressure which is substantially equivalent to that possessed by the fresh feed of reactants, they leave the compressor 83 through a pipe 84 and are introduced into the pressure chamber 50.

As has been previously described, the ammonia vapor in the recycle reactants absorbs the aqueous vapor which is present in the fresh feed which is also introduced into the pressure chamber 50. This pressure chamber serves as a means for mixing and adjusting the quantities of recycle gas and fresh feed which are introduced into the synthesis reactor. In most operations, the recycle stream forms about 75 to 90% of the feed which is introduced into the ammonia synthesis reactor.

The fluidized fixed bed ammonia reactor 70 is provided with means of continuously removing a portion of the catalyst. A baffle 87 provides a settling space from which the catalyst may be drawn off as desired through a conduit 88. The conduit 88 leads into a conduit 89 through which the drawn-off catalyst is conducted by conveying means into a depressurizing chamber 90. Therein the catalyst is cooled and reduced to a lower pressure by suitable means prior to its use in the hydrogenation of carbon monoxide. The catalyst emerges from the depressurizing chamber 90 at a pressure in the range of 10 to 30 atmospheres and passes along a pipe 92 under gravity flow or through suitable conveying means until it reaches the pipe 12 through which flows the fresh feed of synthesis gas which is used in the hydrogenation of carbon monoxide.

As has been previously described, the synthesis gas which has been obtained from the oxidative combustion of a hydrocarbon gas in the synthesis gas generator 7 is divided into two portions. The treatment of one of these streams has been described. The other portion flows along pipe 12 and therethrough is introduced into a reactor 95 which is used for the catalytic conversion of carbon monoxide and hydrogen into valuable hydrocarbons or oxygenated hydrocarbons. The reactor 95 is a fluidized bed type of converter. Herein the iron catalyst which has been used in the catalytic conversion of nitrogen and hydrogen into ammonia is maintained in a fluid state of gentle ebullition by correlating the density of the fluid stream and the velocity at which it enters the reactor 95 with the density and particle size of the catalytic material contained therein. A pressure of 10 to 30 atmospheres is maintained throughout the catalyst chamber.

A heat exchange medium such as a mixture of diphenyl flows through cooling coils 96. The heat exchange medium enters the cooling coils 96 through a pipe 97 and leaves through a pipe 98. The catalyst which is maintained in a state simulating that of boiling is designated by the numeral 99. The catalyst is introduced into the reactor 95 by means of the stream of reactants which enter the reactor through the pipe 12.

In this reactor also, a settling space 100 is provided in the upper portion of the reactor 95 in order to remove some of the entrained catalytic powder from the effluent stream through the action of gravity. Filter media designated by the numeral 101 are provided to remove more of the entrained catalyst powder. Cyclone separators or electric precipitators may also advantageously be used to accomplish the separation of the catalyst from the effluent stream of products.

The effluent stream which contains the desired products which may be, for example, liquid hydrocarbons in the gasoline range, leave the carbon monoxide-hydrogenation reactor 95 through a pipe 105 after all the entrained catalytic powder has been removed. The effluent which contains a mixture of products, both liquid and gaseous, proceeds along the pipe 105 to conventional units of condensation, separation and fractionation. Therein, the products are separated into the desired fractions which may be subjected to further treatment of cracking, alkylation, etc. as desired. Such treatment is not shown because it only involves conventional processes which form no part of the invention proper.

A baffle 110 in the lower portion of the reactor 95 provides a settling space from which the catalyst is continuously withdrawn from the reactor 95 through a conduit 111. The withdrawn catalyst then proceeds along a pipe 112 through which it is blown with air into a catalyst regeneration unit which is designated by the numeral 115. Herein the iron catalyst is continuously regenerated by the oxidative removal of carbon followed by reduction. After the catalyst has been regenerated in the catalyst regeneration unit 115, it is returned to the ammonia synthesis unit. Promoters, such as potassium oxide and aluminum oxide are added, if needed, for the maintenance of the proper concentration. It is introduced into the ammonia synthesis by means of the stream of reactants. Thus, the catalyst is conveyed by suitable means along the pipe 120 from the regeneration unit 115 to the pipe 63 through which the fresh reactants are introduced into the ammonia reactor 70.

The carbon dioxide which has been stripped from the hydrogen to be used in the ammonia synthesis may be utilized in a number of ways. This carbon dioxide leaves the regenerator 25 through the pipe 32. A portion of this carbon dioxide may be introduced into the carbon monoxide-hydrogenation reactor 95. In this instance, a portion of carbon dioxide passes along the pipe 32 and is introduced into the pipe 12 through which the feed of synthesis gas flows. Another portion of the carbon dioxide may be introduced into the synthesis gas generator 7 in order to control the combustion taking place therein. In this instance, a portion of the carbon dioxide leaves the pipe 32 through a branch pipe 125 and is introduced into the generator 7. The unused portion of carbon dioxide is vented through a pipe 126.

It is possible to effect the hydrogenation of carbon monoxide in conjunction with the synthesis of ammonia in a manner different than that which has been herein disclosed. In doing so, it will be possible to take advantage of a number of features of this invention. The manner in which they have been combined is regarded as the preferred embodiment of the conjunctive process. However, other modifications are included within the concept of the invention.

Obviously many modifications and variations of the invention, as hereinbefore set forth, may be made without departing from the spirit and scope thereof and, therefore, only such limitations should be imposed as are indicated in the appended claims.

I claim:

1. In a process for the synthesis of ammonia from hydrogen and nitrogen and for the synthesis of hydrocarbons from hydrogen and carbon monoxide, the steps comprising converting nitrogen and hydrogen to ammonia in the presence of an iron catalyst with consequent reduction in activity of the catalyst for the ammonia synthesis reaction, subsequently converting carbon monoxide and hydrogen to hydrocarbons in the presence of said catalyst of reduced activity for the ammonia synthesis reaction, thereafter regenerating said catalyst to restore its activity for the ammonia synthesis reaction, and again converting nitrogen and hydrogen to ammonia in the presence of said regenerated catalyst.

2. In a process wherein an ammonia synthesis is carried out in conjunction with the catalytic conversion of a mixture of carbon monoxide and hydrogen to hydrocarbons and oxygenated hydrocarbons, the steps comprising converting nitrogen and hydrogen into ammonia by contact with an iron catalyst in a reaction zone whereupon the activity of the catalyst for the ammonia synthesis reaction is substantially reduced, transferring iron catalyst of reduced activity from said reaction zone to a hydrocarbon synthesis zone, converting carbon monoxide and hydrogen into hydrocarbons and oxygenated hydrocarbons by contact with said iron catalyst of reduced activity for the ammonia synthesis reaction in said hydrocarbon synthesis zone whereupon the activity of the catalyst for the synthesis of hydrocarbons and oxygenated hydrocarbons is reduced, removing iron catalyst of reduced activity for the hydrocarbon synthesis reaction from said hydrocarbon synthesis zone, restoring the activity of said catalyst for the ammonia synthesis reaction, and returning catalyst of renewed activity to the zone wherein the ammonia synthesis takes place.

3. A process as defined in claim 2 wherein the catalyst is maintained in a fluidized bed in said hydrocarbon synthesis zone.

4. A process as defined in claim 2 wherein the catalyst is maintained in a fluidized bed in each of said reaction zones.

5. A process as defined in claim 2 wherein said catalyst comprises finely divided iron of about 100 to 300 mesh promoted with potassia and alumina.

6. A process as defined in claim 2 wherein the regeneration of the catalyst comprises oxidation followed by reduction.

LEBBEUS C. KEMP, Jr.

REFERENCES CITED

The following references are of record in the file of this patent:

UNITED STATES PATENTS

| Number | Name | Date |
| --- | --- | --- |
| 1,083,585 | Bosch | Jan. 6, 1914 |
| 1,202,995 | Haber et al. | Oct. 31, 1916 |
| 1,252,726 | Schmidt | Jan. 8, 1918 |
| 1,386,760 | Bosch | Aug. 9, 1921 |
| 2,248,993 | Houdry | July 15, 1941 |
| 2,266,161 | Campbell et al. | Dec. 16, 1941 |
| 2,373,008 | Becker | Apr. 3, 1945 |